US012561640B2

(12) United States Patent
D'Souza et al.

(10) Patent No.: US 12,561,640 B2
(45) Date of Patent: Feb. 24, 2026

(54) METHOD AND SYSTEM TO STREAMLINE RETURN DECISION AND OPTIMIZE COSTS

(71) Applicant: Tata Consultancy Services Limited, Mumbai (IN)

(72) Inventors: Shaun Cyprian D'Souza, Thane (IN); Gaurav Jain, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 104 days.

(21) Appl. No.: 18/416,270

(22) Filed: Jan. 18, 2024

(65) Prior Publication Data

US 2025/0086577 A1 Mar. 13, 2025

(30) Foreign Application Priority Data

Sep. 12, 2023 (IN) .............................. 202321061414

(51) Int. Cl.
| | |
|---|---|
| G06Q 10/0837 | (2023.01) |
| G06N 3/092 | (2023.01) |
| G06Q 10/087 | (2023.01) |
| G06Q 30/0202 | (2023.01) |

(52) U.S. Cl.
CPC ......... G06Q 10/0837 (2013.01); G06N 3/092 (2023.01); G06Q 10/087 (2013.01); G06Q 30/0202 (2013.01)

(58) Field of Classification Search
None
See application file for complete search history.

(56) References Cited

U.S. PATENT DOCUMENTS

| | | | | |
|---|---|---|---|---|
| 11,645,617 | B1 * | 5/2023 | McDonald | G06N 7/01 |
| | | | | 705/28 |
| 11,922,440 | B2 * | 3/2024 | Lei | G06Q 30/0201 |
| 2019/0259043 | A1 * | 8/2019 | Koneri | G06Q 10/087 |
| 2024/0028993 | A1 * | 1/2024 | Ouyang | G06Q 10/08 |

FOREIGN PATENT DOCUMENTS

WO WO2020229904 A1 11/2020

OTHER PUBLICATIONS

D'Souza, Implementing Reinforcement Learning Algorithms in Retail Supply Chains with OpenAI Gym Toolkit, Apr. 27, 2021 (Year: 2021).*
D'Souza, Shaun, "Implementing Reinforcement Learning Algorithms in Retail Supply Chains with OpenAI Gym Toolkit", Date: 2021, Publisher: arxiv, Link: https://arxiv.org/pdf/2104.14398.pdf.

* cited by examiner

*Primary Examiner* — Chesiree A Walton
(74) *Attorney, Agent, or Firm* — Finnegan, Henderson, Farabow, Garrett & Dunner, LLP

(57) ABSTRACT

The embodiments of present disclosure herein address unresolved problems in existing initiatives to optimize costs and streamline the return decisions which are based on legacy infrastructure and explicit rules such as a SQL database. Embodiments herein provide a method and system for streamlining return decision in a supply chain network and optimizing costs. The system is configured to create a returns decision environment using an OpenAI gym base class. Created classes lend extensibility for Reinforcement Learning (RL) applications through a supply chain management environment base class and more specific returns decision environment class. These encapsulate all of the environment functions including exploration of contextual information in the dataset.

20 Claims, 13 Drawing Sheets

100

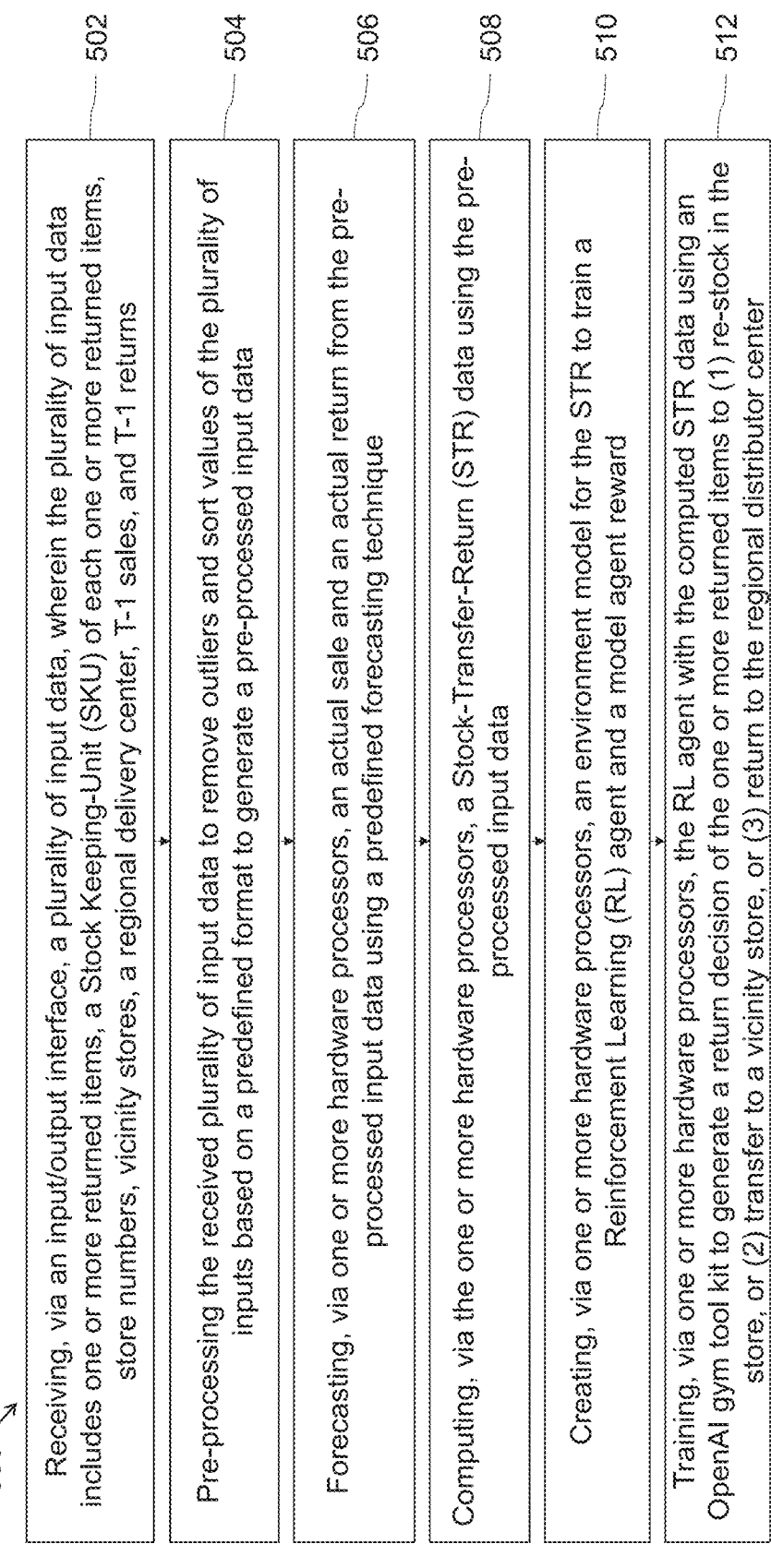

500

Receiving, via an input/output interface, a plurality of input data, wherein the plurality of input data includes one or more returned items, a Stock Keeping-Unit (SKU) of each one or more returned items, store numbers, vicinity stores, a regional delivery center, T-1 sales, and T-1 returns

502

Pre-processing the received plurality of input data to remove outliers and sort values of the plurality of inputs based on a predefined format to generate a pre-processed input data

504

Forecasting, via one or more hardware processors, an actual sale and an actual return from the pre-processed input data using a predefined forecasting technique

506

Computing, via the one or more hardware processors, a Stock-Transfer-Return (STR) data using the pre-processed input data

508

Creating, via one or more hardware processors, an environment model for the STR to train a Reinforcement Learning (RL) agent and a model agent reward

510

Training, via one or more hardware processors, the RL agent with the computed STR data using an OpenAI gym tool kit to generate a return decision of the one or more returned items to (1) re-stock in the store, or (2) transfer to a vicinity store, or (3) return to the regional distributor center

METHOD AND SYSTEM TO STREAMLINE RETURN DECISION AND OPTIMIZE COSTS

CROSS-REFERENCE TO RELATED APPLICATIONS AND PRIORITY

This U.S. patent application claims priority under 35 U.S.C. § 119 to Indian Application number 202321061414, filed on Sep. 12, 2023. The entire contents of the aforementioned application are incorporated herein by reference.

TECHNICAL FIELD

The disclosure herein generally relates to a retail supply chain, and, more particularly, to a method and system for streamlining return decision in a supply chain network and optimizing costs.

BACKGROUND

With the rapid development of e-commerce, online shopping has become one of the indispensable consumption channels for consumers. The global retail e-commerce industry experienced significant growth during the lockdown caused by the Coronavirus Disease 2019 (COVID-19). However, online sales also bring great pressure and challenges to manufacturers. The first reason for that is the large number of returns. Since consumers do not directly contact the products in advance, there are many returns due to incorrect sizes, inconsistent specifications, colour differences, dislikes, and inappropriate fit.

Supply chains today assume a large complex monolithic infrastructure. Vendors leverage building blocks from an expensive, disparate, and incompatible ecosystem leading to duplication of logistical efforts, delays, and wastage. Customers today are moving from brick-and-mortar stores to online in a globalized economy.

Generally, many retailers have $1 Billion of sales returned annually. Only half of this value is recovered due to several reasons including damage and obsolescence due to the availability recovery time. This is a direct impact on the net margins of customer. In addition to this the operational cost of processing and managing returns cost is around $50 M annually. Existing initiatives to optimize costs and streamlining the returns process are based on legacy infrastructure and explicit rules such as a SQL database.

SUMMARY

Embodiments of the present disclosure present technological improvements as solutions to one or more of the above-mentioned technical problems recognized by the inventors in conventional systems. For example, in one embodiment, a method to streamline return decision in a supply chain network and optimize costs is provided. The processor-implemented method includes receiving, via an input/output interface, an input data, wherein the input data includes one or more returned items, a Stock Keeping-Unit (SKU) of each one or more returned items, store numbers, vicinity stores, a regional delivery center, T–1 sales, and T–1 returns. Further, the processor-implemented method comprises pre-processing, via the one or more hardware processors, the received input data to remove outliers and sort values of the plurality of inputs based on a predefined format to generate a pre-processed input data, and forecasting, via one or more hardware processors, an actual sale and an actual return from the pre-processed input data using a predefined forecasting technique.

Furthermore, the processor-implemented method comprises computing, via the one or more hardware processors, a Stock-Transfer-Return (STR) data using the pre-processed input data. Further, the processor-implemented method comprises creating, via one or more hardware processors, an environment model for the STR to train a Reinforcement Learning (RL) agent and a model agent reward. Finally, the processor-implemented method comprises training, via one or more hardware processors, the RL agent with the computed STR data using an OpenAI gym tool kit to generate a return decision of the one or more returned items to (1) re-stock in the store, or (2) transfer to a vicinity store, or (3) return to the regional distributor center.

In another aspect, a system for streamlining return decision in a supply chain network and optimizing costs is provided. The system comprises a memory storing a plurality of instructions and one or more Input/Output (1/O) interfaces to receive an input data, wherein the input data includes one or more returned items, a Stock Keeping-Unit (SKU) of each one or more returned items, store numbers, vicinity stores, a regional delivery center, T–1 sales, and T–1 returns. Further, the system comprises one or more hardware processors coupled to the memory via the one or more I/O interfaces, wherein the one or more hardware processors are configured by the instructions to pre-process the received input data to remove outliers and sort values of the plurality of inputs based on a predefined format to generate a pre-processed input data. Further, the one or more hardware processors are configured to forecast an actual sale and an actual return from the pre-processed input data using a predefined forecasting technique. Furthermore, the one or more hardware processors are configured to compute a Stock-Transfer-Return (STR) data using the pre-processed input data.

Further, the one or more hardware processors are configured to create an environment model for the STR to train a Reinforcement Learning (RL) agent and a model agent reward. Finally, the one or more hardware processors are configured to train the RL agent with the computed STR data using an OpenAI gym tool kit to generate a return decision of the one or more returned items to (1) re-stock in the store, or (2) transfer to a vicinity store, or (3) return to the regional distributor center.

In yet another aspect, there are provided one or more non-transitory machine-readable information storage mediums comprising one or more instructions, which when executed by one or more hardware processors causes a method to recommend optimum configurations in industrial control systems for improving quality of product is provided. The processor-implemented method includes receiving, via an input/output interface, an input data, wherein the input data includes one or more returned items, a Stock Keeping-Unit (SKU) of each one or more returned items, store numbers, vicinity stores, a regional delivery center, T–1 sales, and T–1 returns. Further, the processor-implemented method comprises pre-processing, via the one or more hardware processors, the received input data to remove outliers and sort values of the plurality of inputs based on a predefined format to generate a pre-processed input data, and forecasting, via one or more hardware processors, an actual sale and an actual return from the pre-processed input data using a predefined forecasting technique.

Furthermore, the processor-implemented method comprises computing, via the one or more hardware processors, a Stock-Transfer-Return (STR) data using the pre-processed input data. Further, the processor-implemented method comprises creating, via one or more hardware processors, an environment model for the STR to train a Reinforcement Learning (RL) agent and a model agent reward. Finally, the processor-implemented method comprises training, via one or more hardware processors, the RL agent with the computed STR data using an OpenAI gym tool kit to generate a return decision of the one or more returned items to (1) re-stock in the store, or (2) transfer to a vicinity store, or (3) return to the regional distributor center.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5 is a flow diagram illustrating a processor-implemented method for streamlining return decision in a supply chain network and optimizing costs implemented by the system of FIG. 1.

DETAILED DESCRIPTION OF EMBODIMENTS

Figure 1:
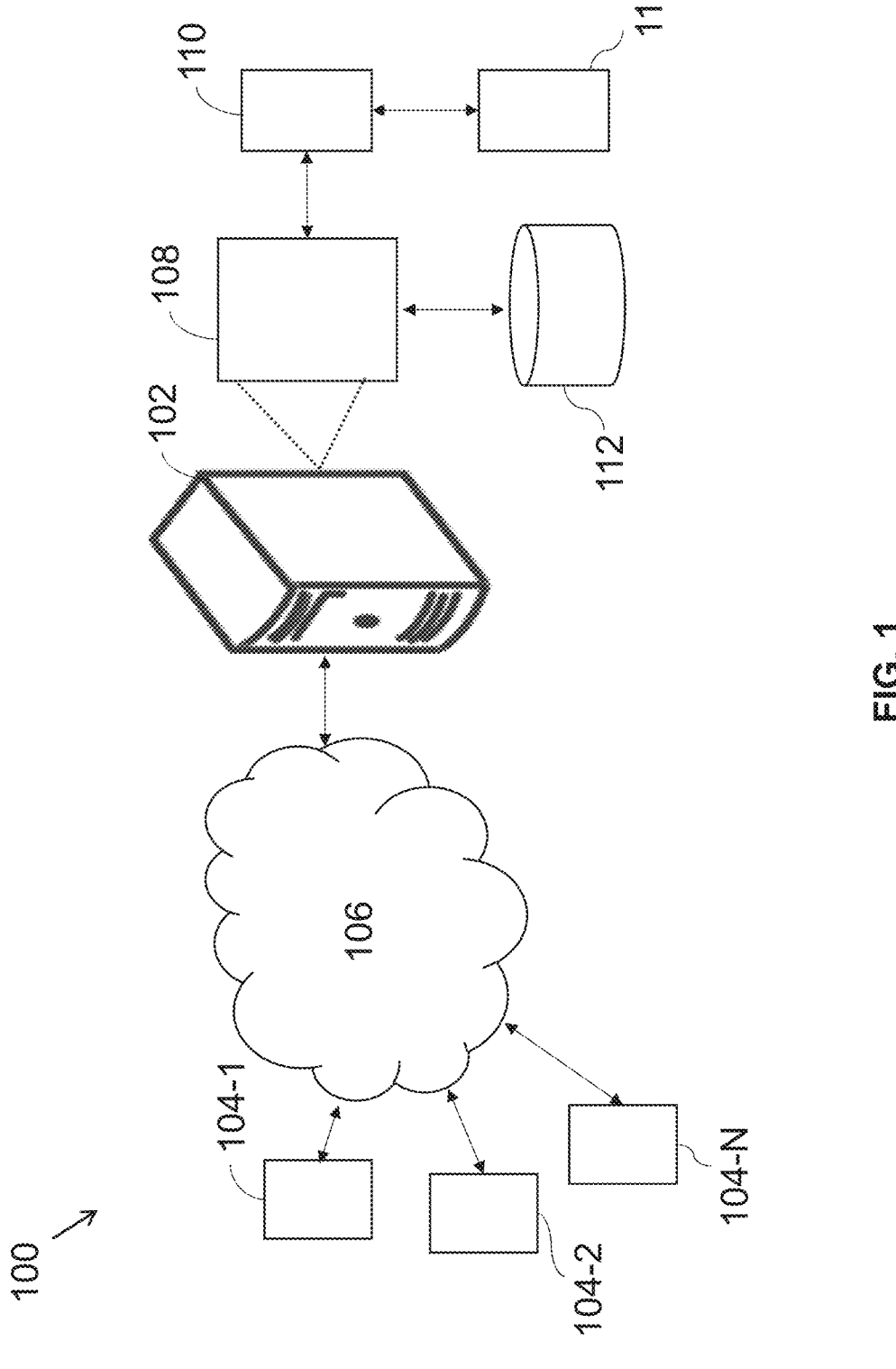
FIG. 1 illustrates an exemplary system for streamlining return decision in a supply chain network and optimizing costs, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Supply chains today assume a large complex monolithic infrastructure. Vendors leverage building blocks from an expensive, disparate, and incompatible ecosystem leading to duplication of logistical efforts, delays, and wastage. Incompatible technology stacks and/or business ecosystems lead to further market fragmentation. Customers today are moving from brick-and-mortar stores to online in a globalized economy.

For sophisticated Supply Chain Management (SCM) environments it becomes increasingly difficult for traditional Reinforcement Learning (RL) to consume a state space. Customizing these becomes cumbersome as feature dimensionalities change. Implementing deep learning-based reinforcement learning enables us to circumvent these challenges in the traditional learning paradigm. The observation space is a representation of the current state of the supply chain network. These are the stores and their regional DCs. Thereby creating synergies and markets industry-wide through network effects. These encompass a physical implementation that can be simulated in a live supply chain network to provide guidance on a return's decision for store and online returned products.

In a supply chain use case however, the outcomes are not so obvious and have to be crafted to meet a specific use case. Defining a rewards strategy allows the agent to learn an exploratory search space and propagate intermediate q-value rewards for unknown or uncertain outcomes to take an informed decision. A Deep Reinforcement Learning (DRL) model is used to determine the returns decision corresponding to a returned item.

To date there don't exist any supply chain modeling environments that allow users to study the various facets of a supply chain and recommend actions to take in a simulation model. There are some non-Artificial Intelligence (AI) based python libraries. While they support a set of functions, they do not integrate with AI or Supply Chain Management (SCM) model libraries or use cases. Most Operations Research (OR) libraries do not support AI based applications, but specific optimization use cases. Due to the lack of extensibility in supporting AI use cases, these models can be termed for studying classical SCM systems. These models can contrast with a scenario where an agent is learning to play a game. In classical games there is a notion of a reward associated to a terminal outcome wherein a player either wins or loses. Games are also governed by a set of well-defined rules and guidelines on playability.

To overcome the challenges of the conventional approaches, embodiments herein provide a method and system for streamlining return decision in a supply chain network and optimizing costs. The disclosure herein unlocks SCM value, and dynamics through a novel AI based software architecture model. This future proof a supply chain for performing tasks intelligently in a rapidly modern world. Producers and consumers participate in a marketplace. Thereby creating an ecosystem of plug and play, and commoditized building blocks. Reinforcement learning is being used to solve a host of supply chain optimization challenges. These range from creation of a digital twin for different cogs in the supply chain. Modeling each of these actors in a simulation entails the creation of environment models and definition of reward functions customized to learn their functions in an online manner.

The return decision initiatives like Stock, Transfer, and Return (STR) optimize costs and streamline the returns process. The return process includes re-stock returned items in the store, or transfer them to a vicinity store, or return to a regional distributor center (DC). The system is configured to create a returns decision environment using an OpenAI gym base class. Created classes lend extensibility for Reinforcement Learning (RL) applications through a supply chain management environment base class and more specific returns decision environment class. These encapsulate all of the environment functions including exploration of contextual information in the dataset. Python is a high-level open-source scripting language. A number of its high-performance libraries are in the C language to run natively on the target platform. This can be contrasted with a Java runtime application JAR that typically runs within a virtual machine. Python is most suitable for developing extensible and reusable AI models/library API.

Referring now to the drawings, and more particularly to FIG. 1 through FIG. 13, where similar reference characters denote corresponding features consistently throughout the figures, there are shown preferred embodiments, and these embodiments are described in the context of the following exemplary system and/or method.

FIG. 1 illustrates a block diagram of a system 100 for streamlining return decision in a supply chain network and optimizing costs, in accordance with an example embodiment. Although the present disclosure is explained considering that the system 100 is implemented on a server, it may be understood that the system 100 may comprise one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104–N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 is communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 supports various connectivity options such as BLUETOOTH®, USB, ZigBee, and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. Further, the system 100 comprises at least one memory 110 with a plurality of instructions, one or more databases 112, and one or more hardware processors 108 which are communicatively coupled with the at least one memory 110 to execute a plurality of modules 114 therein. The plurality of modules 114, for example, includes a multilayer perceptron module 202, and an optimization module 204. The components and functionalities of the system 100 are described further in detail.

Figure 2:
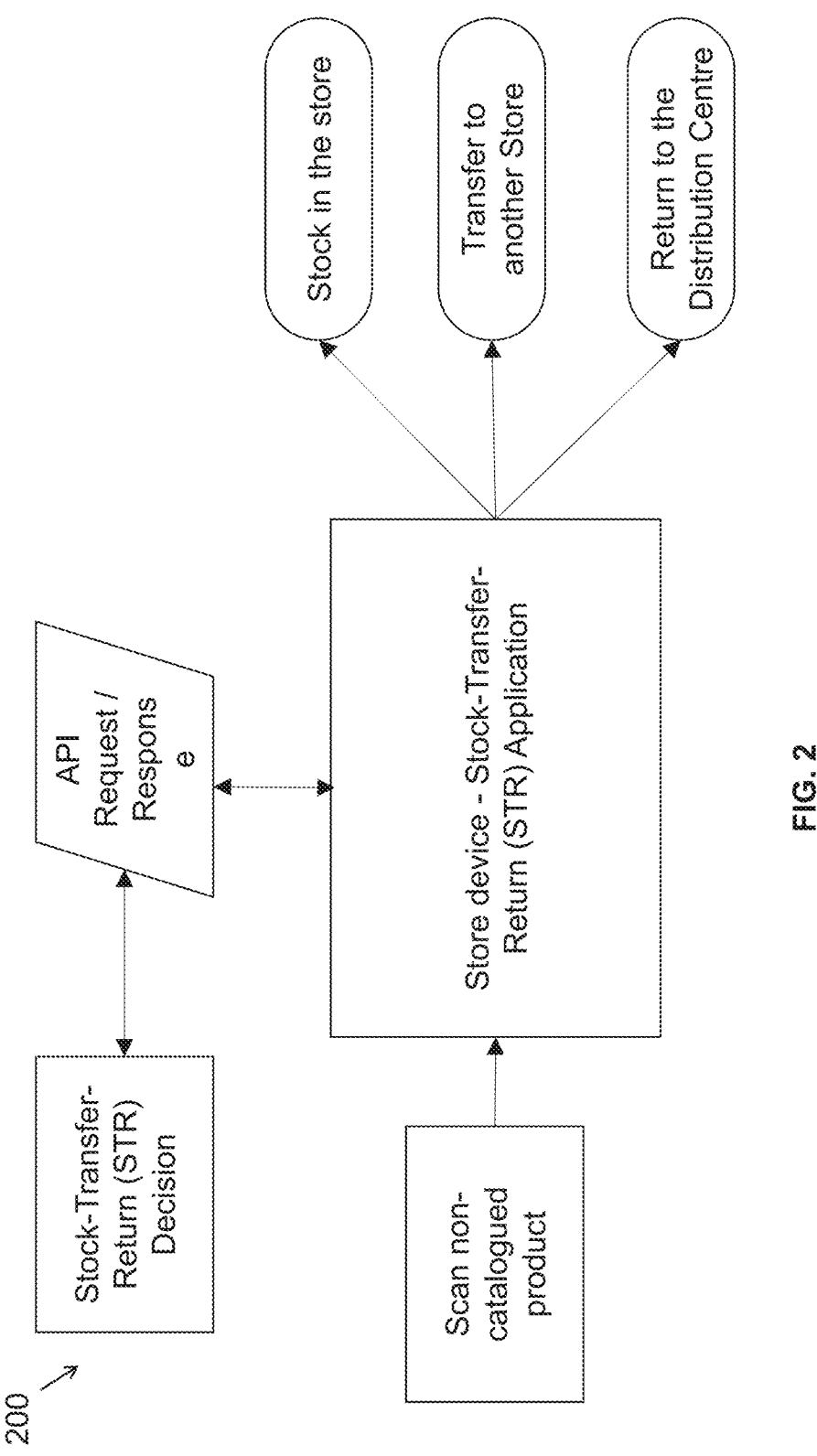
FIG. 2 is a functional block diagram to illustrate returns decision based on a return decision environment model implemented by the system of FIG. 1, according to some embodiments of the present disclosure.

FIG. 2 is a functional block diagram 200 to recommend returns decision based on a return decision environment model implemented by the system 100 of FIG. 1. Returns decision is a specific return process to determine a Stock-Transfer-Return (STR) action corresponding to an item returned in the store. The return process includes (1) re-stocking returned items in the store, or (2) transferring them to a vicinity store, or (3) return to a regional distributor center (DC).

Figure 3:
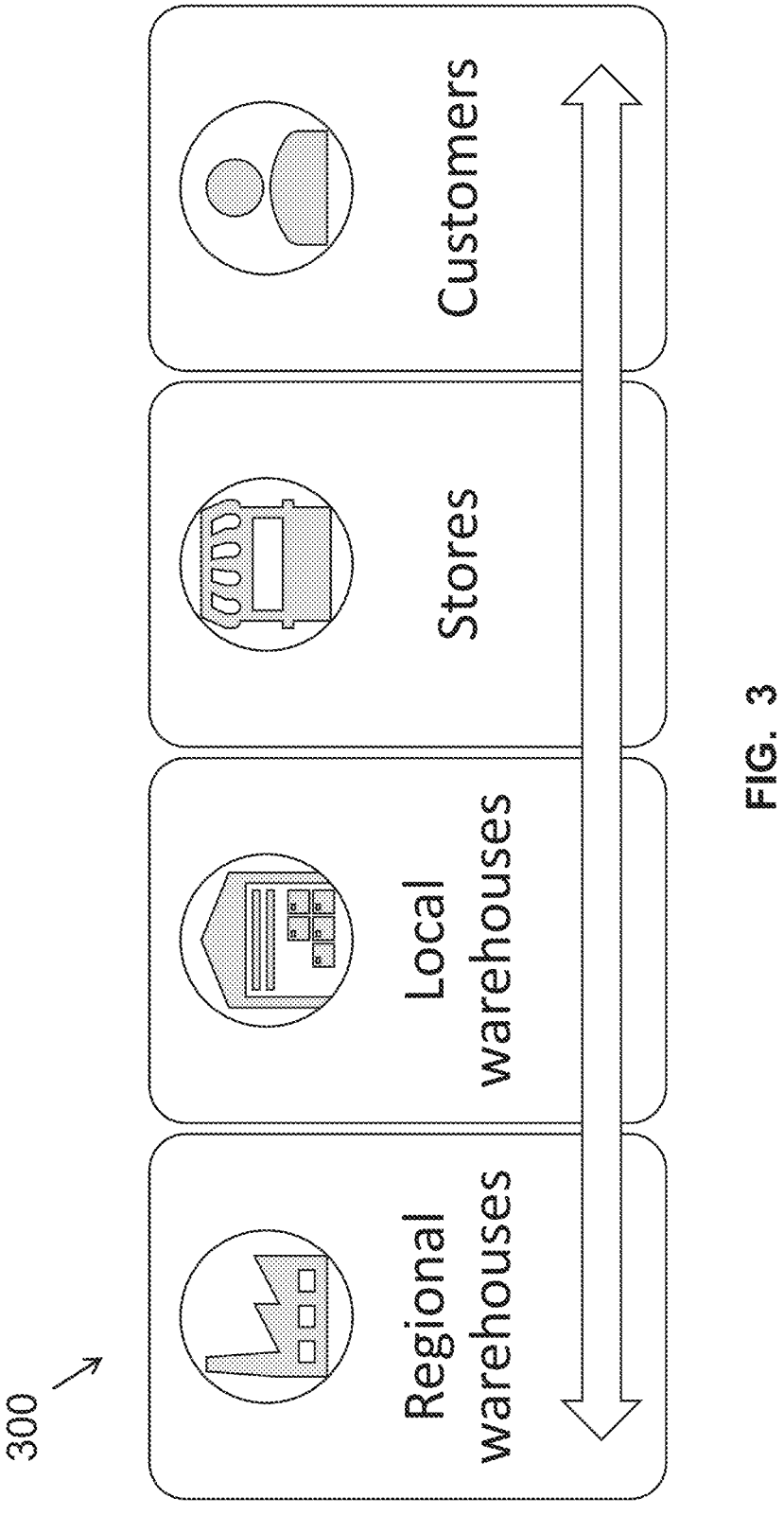
FIG. 3 is a block diagram to illustrate some of the components of a supply chain, according to some embodiments of the present disclosure.

FIG. 3 is a block diagram 300 to illustrate some of the components of a supply chain, according to some embodiments of the present disclosure. Modeling each of these actors in a simulation entails the creation of environment models and definition of reward functions customized to learn their functions in an online manner.

Figure 4:
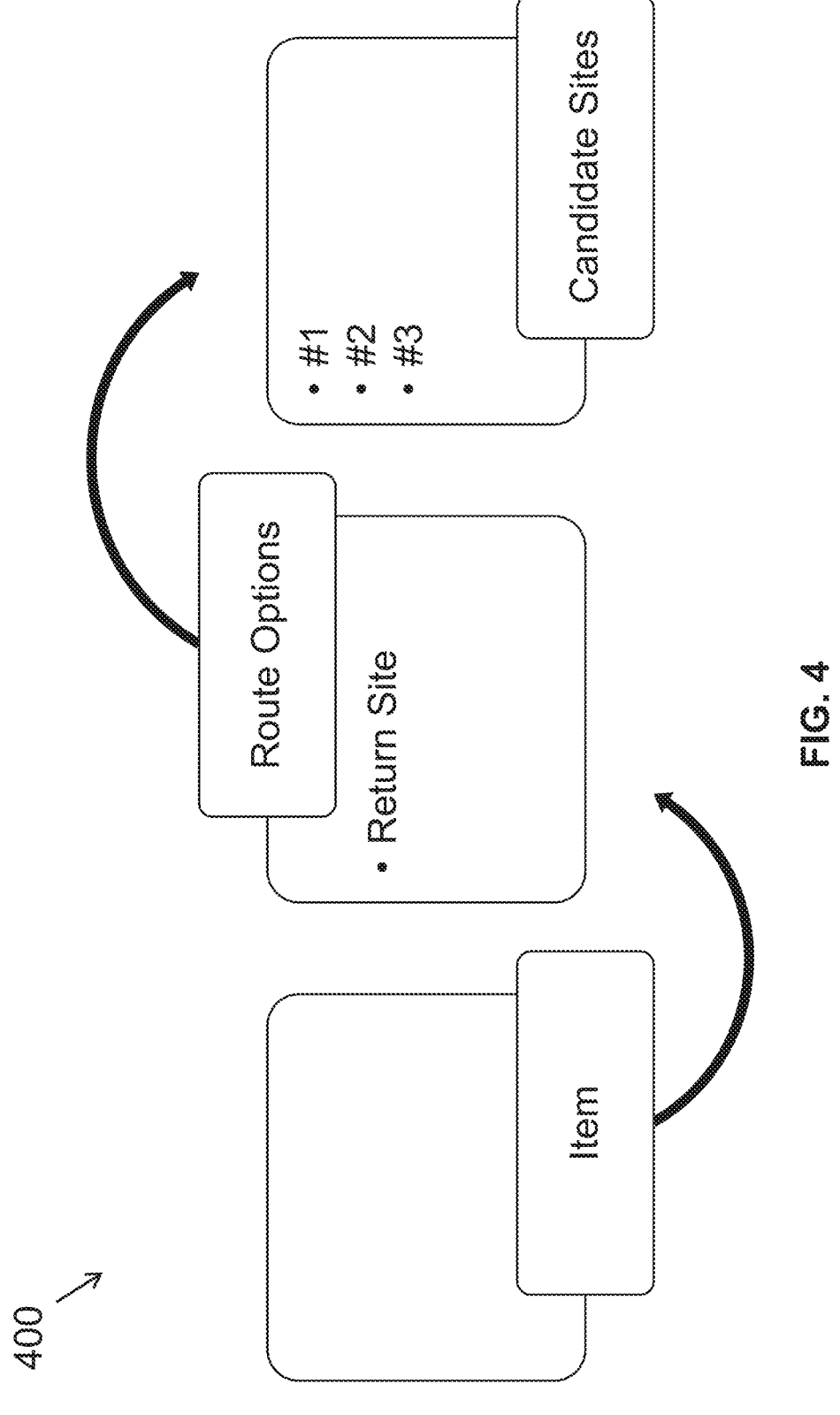
FIG. 4 shows a slice of a supply chain represented as an observation context, according to some embodiments of the present disclosure.

FIG. 4 shows a slice of a supply chain represented as an observation context, according to some embodiments of the present disclosure. The observation space allows the system to take a slice of an existing supply chain and evaluate it in a reinforcement learning (RL) agent. This could include state information for entities in a supply chain such as inventory levels or upcoming sales details. This information constitutes an observation value in an environment to train a reinforcement learning (RL) model.

FIG. 5 is a flow diagram illustrating a processor-implemented method 500 for streamlining return decision in a supply chain network and optimizing costs implemented by the system 100 of FIG. 1. Functions of the components of the system 100 are now explained with reference to FIG. 2 through steps of flow diagram in FIG. 5, according to some embodiments of the present disclosure.

Initially, at step 502 of the processor-implemented method 500, the one or more hardware processors 108 are configured by the programmed instructions to receive, via an input/output interface, an input data, wherein the plurality of input data includes one or more returned items, a Stock Keeping-Unit (SKU) of each one or more returned items, store numbers, vicinity stores, a regional delivery center, T–1 sales, and T–1 returns. Herein, the T–1 sales include sales of previous week or previous month in the calendar year. Similarly, T–1 returns are returns of previous week or previous month in the calendar year.

At the next step 504 of the processor-implemented method 500, the one or more hardware processors 108 are configured by the programmed instructions to pre-process the received input data to remove outliers and sort values of the plurality of inputs based on a predefined format to generate a pre-processed input data. A custom data set is created to input to a reinforcement learning (RL) model train. It uses details such as data, store, and item SKU and corresponding warehouse. In addition, a value of sales and returns is used to get desired outcomes with an end-to-end process. The outcome is a sales dataset that is transformed for the return's decision application. The end data is input to an environment model for the return decisions.

Herein, a reinforcement learning (RL) model maximizes a notion of reward that is provided to the system. Contextual details such as a candidate site, price, and demand as input to the RL optimization layer of the system. In a conventional approach this could use a set of rules or static mathematical cost function. However, the RL model allows a user to learn the optima in the user dataset through exploration and exploitation of a reward function and AI models can discover and resolve optimal constraints in a supply chain network.

Figure 6:
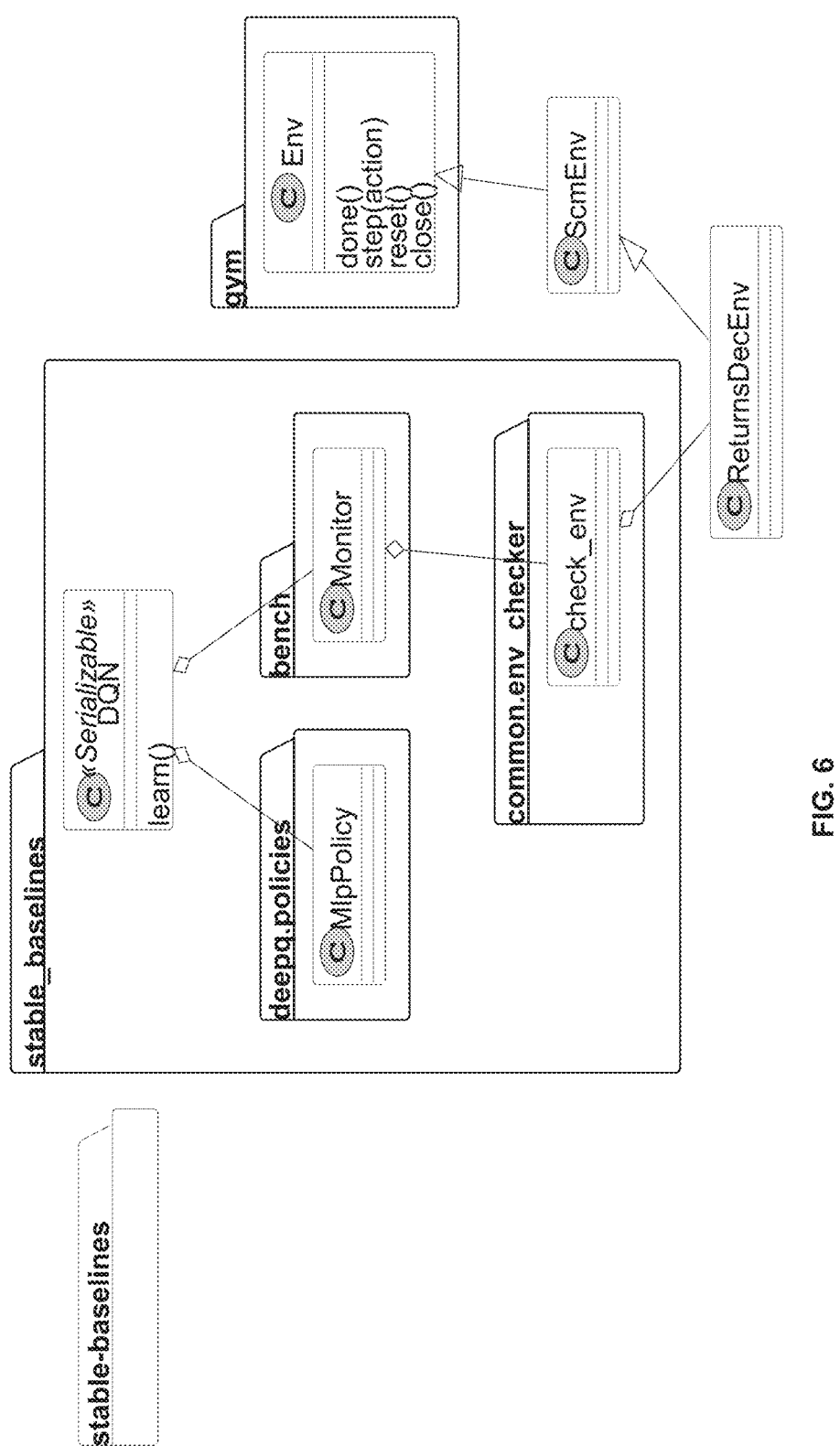
FIG. 6 illustrates training of the environment model for the return decisions using stable baselines, according to some embodiments of the present disclosure.

FIG. 6 is a block diagram 600 illustrating training of the environment model for the return decisions using stable baselines, according to some embodiments of the present disclosure. Herein, the stable baseline models are created in the OpenAI gym to model the return decision across the stores in the supply chain. Some heuristics included a random agent to select a random action to process a return. This is non-optimal, however is used to evaluate a baseline model for rewards. Further, a greedy agent of the heuristics is used to select the STR action on the basis of the return decision process. These are used to establish a working baseline against which to evaluate the RL models. The RL models are trained on 50 episodes. The trained RL model is found to meet the greedy model.

The environment model is created using an OpenAI gym base class. The environmental model is initialized using parametrized input data contexts. The input data includes one or more returned items, a Stock Keeping-Unit (SKU) of each one or more returned items, store numbers, vicinity stores, a regional delivery center, T–1 sales, and T–1 returns. A specific set of functions are customized to implement the OpenAI gym base class for supply chain simulation and reinforcement learning. The environment model allows the system to model classical actors in a simulation. The return decision class interacts with the RL agent in episodic timesteps through each of the functions. These functions are only available as an abstract class in the OpenAI gym.

Figure 7:
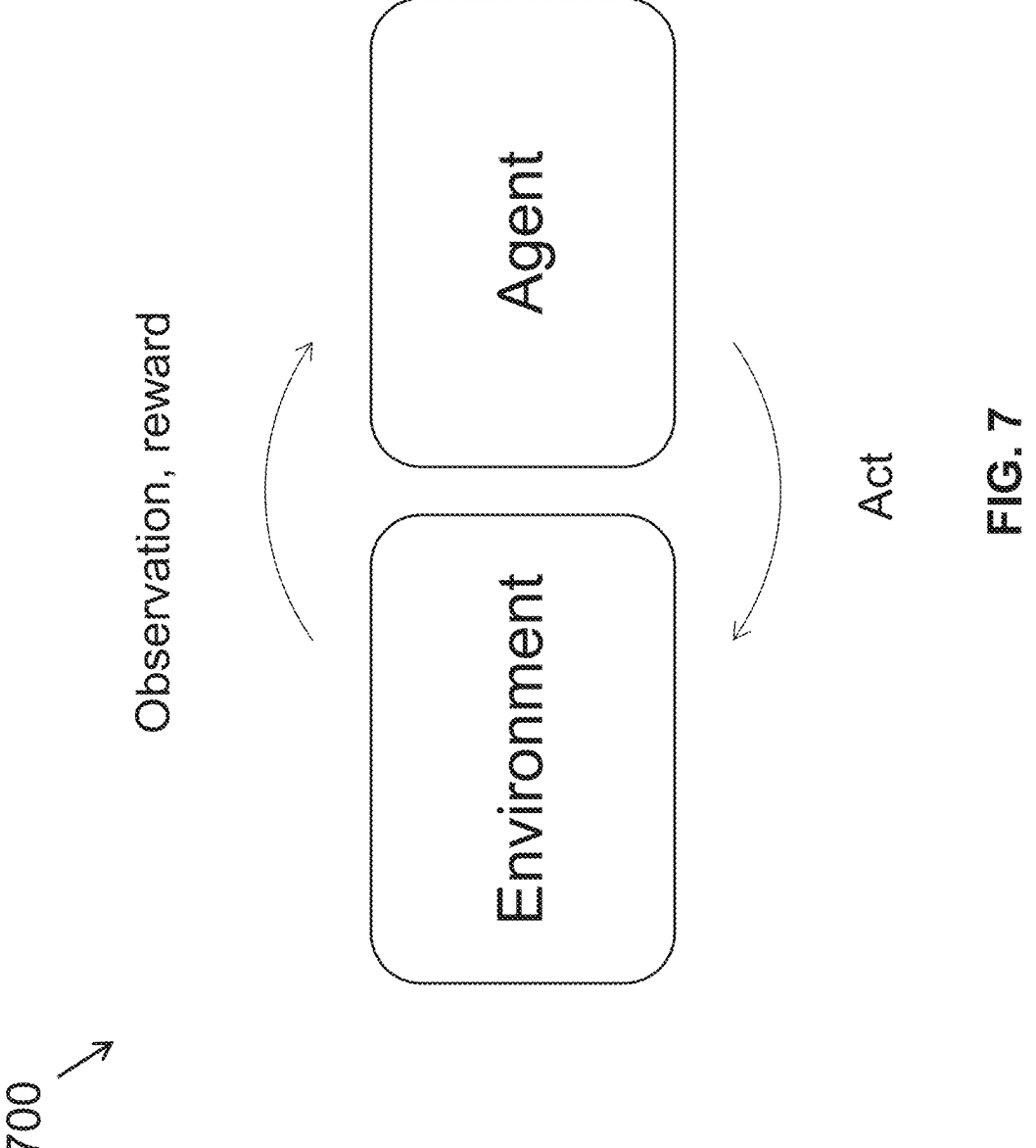
FIG. 7 shows a Reinforcement Learning (RL) agent in an OpenAI gym environment, according to some embodiments of the present disclosure.

FIG. 7 is a block diagram 700 to show an RL agent in an OpenAI gym environment, according to some embodiments of the present disclosure. An act function is defined on the agent to determine the appropriate action, followed by a step function to evaluate the outcome of the action in the current environment.

Further, a control logic is used for creation and initializing the environment model for training the RL agent. The control logic includes a reset step to initialize a current context data frame pointer to an initial value of –1 and updating state value to the value in a next context data frame of the environment model. Further, a state and reward value are provided to the RL agent in a timestep episodic manner to train. Furthermore, an action value is determined by the RL agent in a timestep manner to provide to the environment. The control logic updates a new state value to the value in the next context data frame of the environment model. A STR reward is calculated to determine a reward value corresponding to the action in the environment model. And a done value is determined by the environment model when a current pointer is at the last index of the context data frame.

Figure 8:
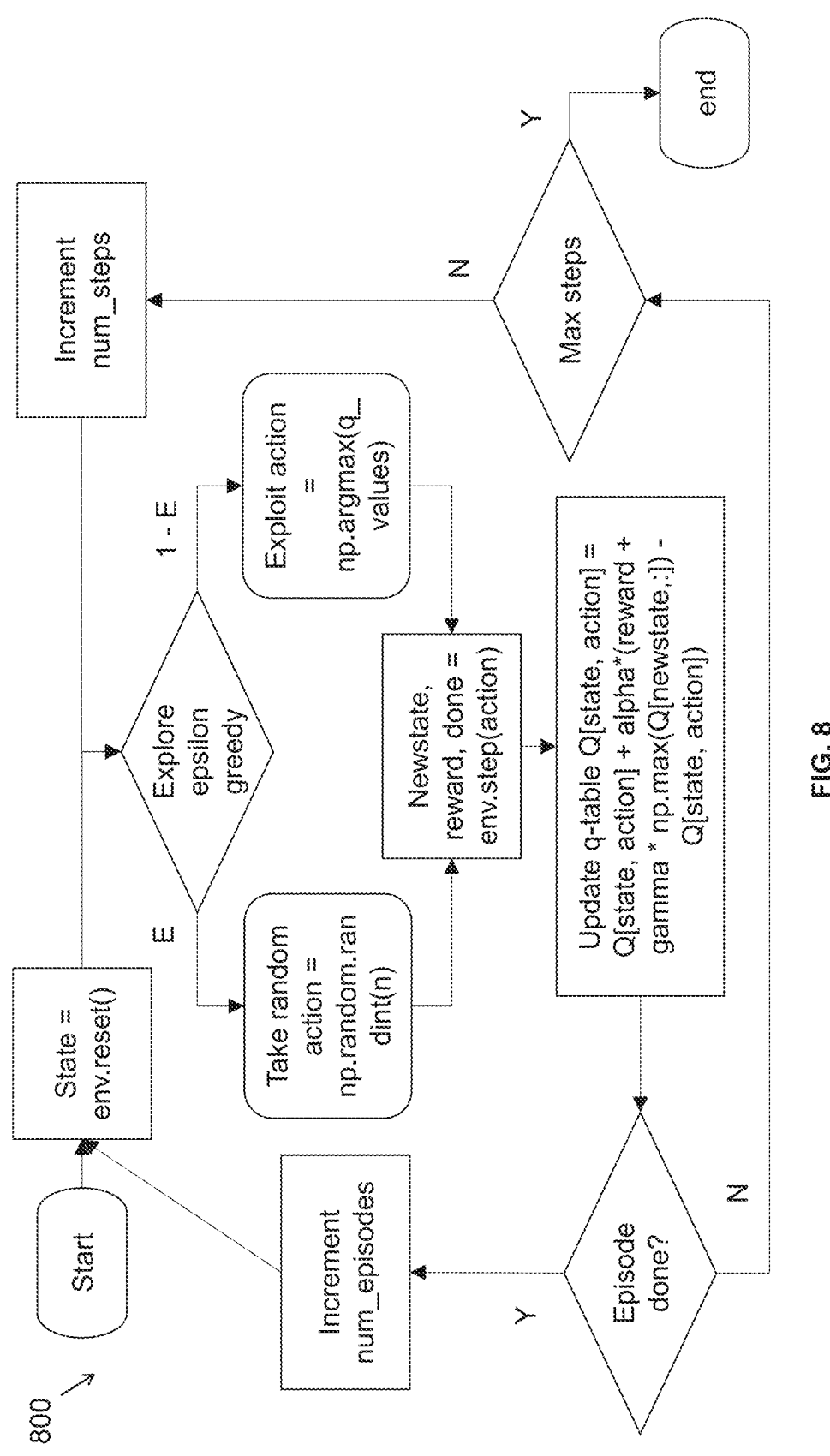
FIG. 8 represents a functional block diagram of a RL model training, according to some embodiments of the present disclosure.

FIG. 8 is a functional block diagram 800 to illustrate a RL model training, according to some embodiments of the present disclosure. Herein, the RL agent takes actions in an epsilon greedy manner in the environment model, according to some embodiments of the present disclosure. Propagation of intermediate q-value rewards is accomplished during the training phase. The q-reward table is used to determine the optimal course of action of the RL agent in the environment.

It is a key learning step in the RL model that enables the RL agent to discover a desired action outcome in the environment model observation state.

Figure 9:
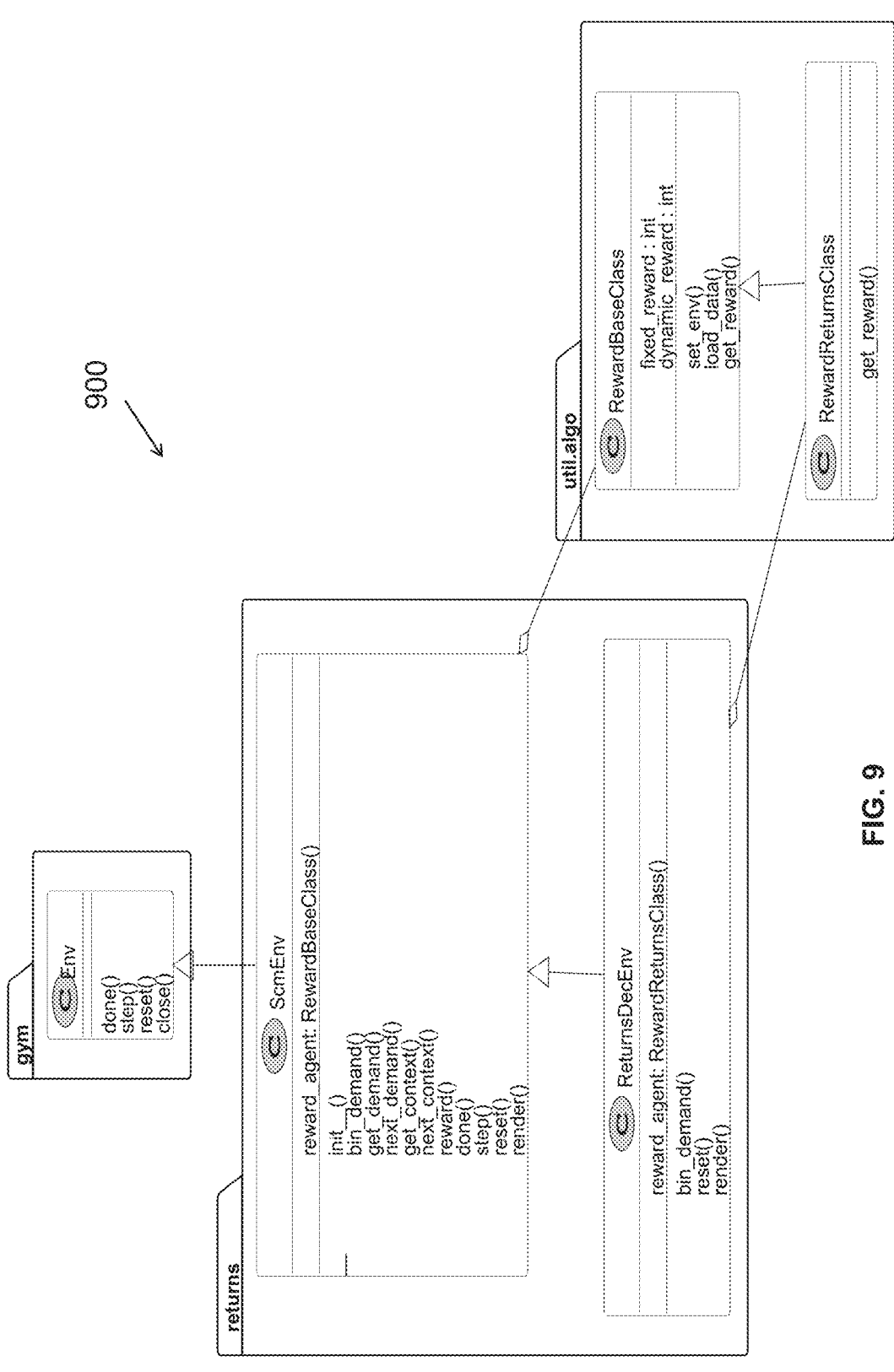
FIG. 9 is a schematic diagram to illustrate rewards agent class hierarchy, according to some embodiments of the present disclosure.
Figure 10:
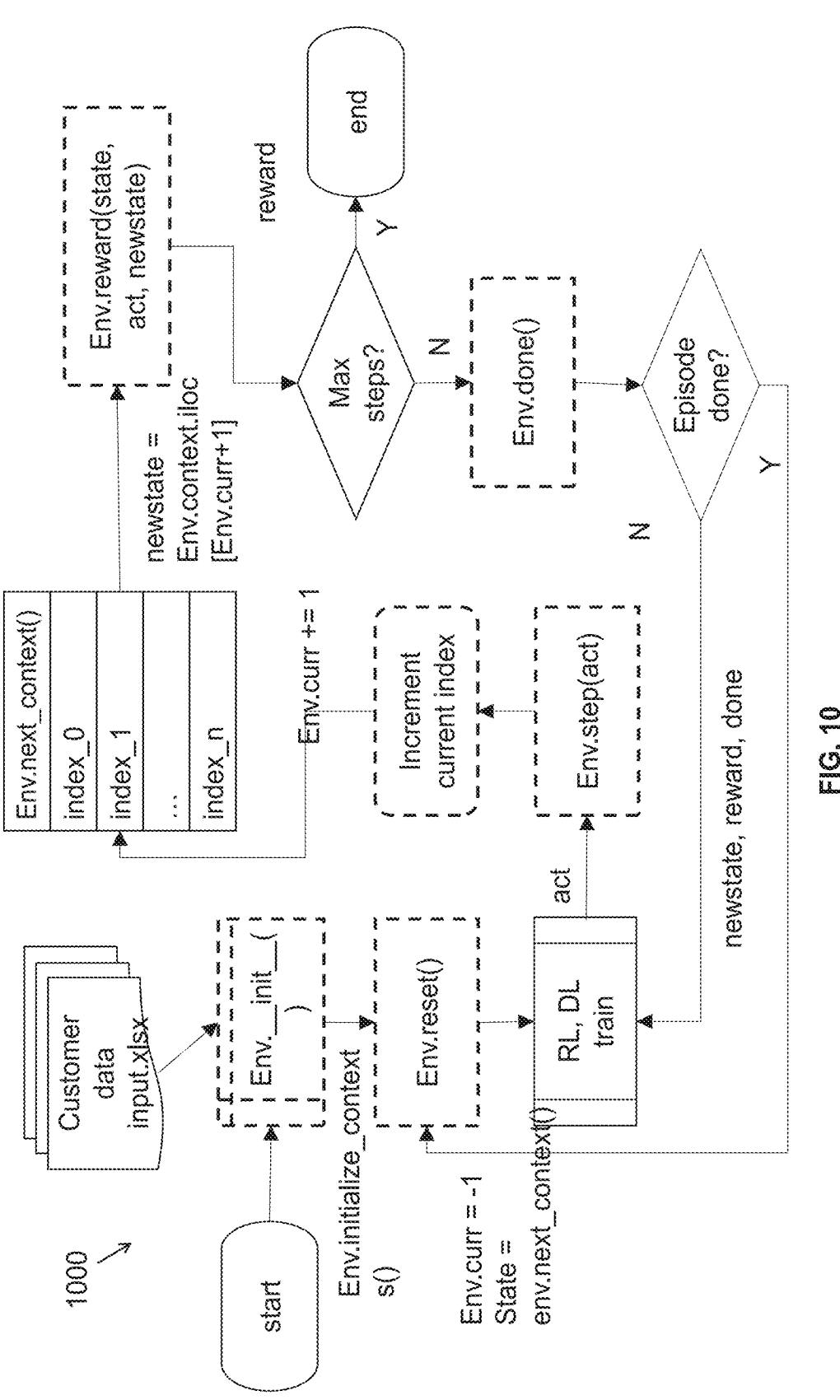
FIG. 10 is a block diagram to illustrate returns decision environment time step Reinforcement Learning, according to some embodiments of the present disclosure.

FIG. 9 is a schematic diagram 900 illustrating rewards agent class hierarchy, according to some embodiments of the present disclosure. A unique returns decision environment is created using the OpenAI gym base class. Created classes lend extensibility for RL applications through a supply chain management environment (scmEnv) base class and more specifically a return decision environment (ReturnsDecEnv) class. These encapsulate all of the environment functions including exploration of contextual information in the dataset. Specifically, observation and action classes which can be consumed in the baseline deep learning environments.

Again, referring FIG. 5, at the next step 506 of the processor-implemented method 500, the one or more hardware processors 108 are configured by the programmed instructions to forecast an actual sale and an actual return from the pre-processed input data using a predefined forecasting technique.

At the next step 508 of the processor-implemented method 500, the one or more hardware processors 108 are configured by the programmed instructions to compute a Stock-Transfer-Return (STR) data using the pre-processed input data. The STR computation comprises determining sales demand for each of the one or more returned items for the store number and the item SKU from the forecasted actual sale and T–1 sale and determining sales demand for each of the one or more returned items in the vicinity store associated with the store number and the item SKU from the forecasted actual sale and T–1 sale. Based on the outcome of the determined sales demand of the each of the one or more returned items is (1) re-stocked in the store, or (2) transferred to a vicinity store, or (3) returned to a regional distributor center (DC) and based on the outcome of the determined sales demand in the vicinity store the item is (1) transferred to the vicinity store, or (2) returned to the regional distributor center (DC).

At the next step 510 of the processor-implemented method 500, the one or more hardware processors 108 are configured by the programmed instructions to create an environment model for the STR to train a Reinforcement Learning (RL) agent and a model agent reward. A rewards agent hierarchy is created for determination of the terminal reward at each step to train the RL agent as shown in a FIG. 10.

Figure 11:
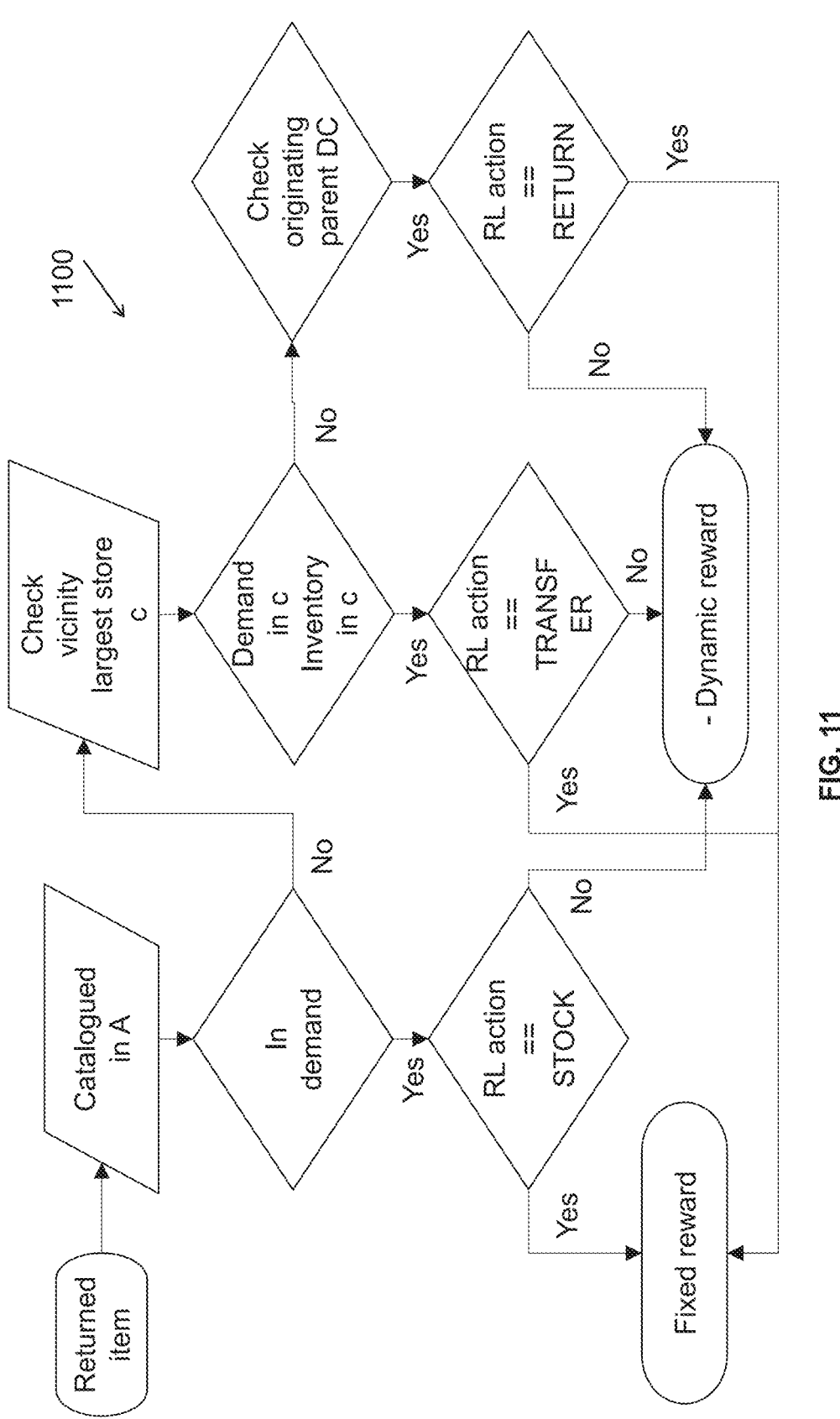
FIG. 11 is a block diagram to illustrate a Stock-Transfer-Return (STR) reward agent, according to some embodiments of the present disclosure.

FIG. 11 is a functional block diagram 1100 to illustrate a STR reward agent, according to some embodiments of the present disclosure. Herein, a tiered reward model is used. E.g., Fixed reward=20, dynamic reward=10. A reward is provided to the RL agent for a favorable outcome of (fixed reward) and for a wrong decision the agent is penalized with a (–dynamic reward). The RL model allows the system to learn the optima in the user dataset through exploration and exploitation of a reward function. Thereby reinforcing positive outcomes and penalizing negative outcomes during RL training. Defining a rewards strategy allows the agent to learn an exploratory search space and propagate intermediate q-value rewards for unknown or uncertain outcomes to take an informed decision.

Referring FIG. 5, finally at the last step 512 of the processor-implemented method 500, the one or more hardware processors 108 are configured by the programmed instructions to train the RL agent with the computed STR data using the OpenAI gym tool kit to generate the return decision of the one or more returned items to (1) re-stock in the store, or (2) transfer to a vicinity store, or (3) return to the regional distributor center.

Figure 12:
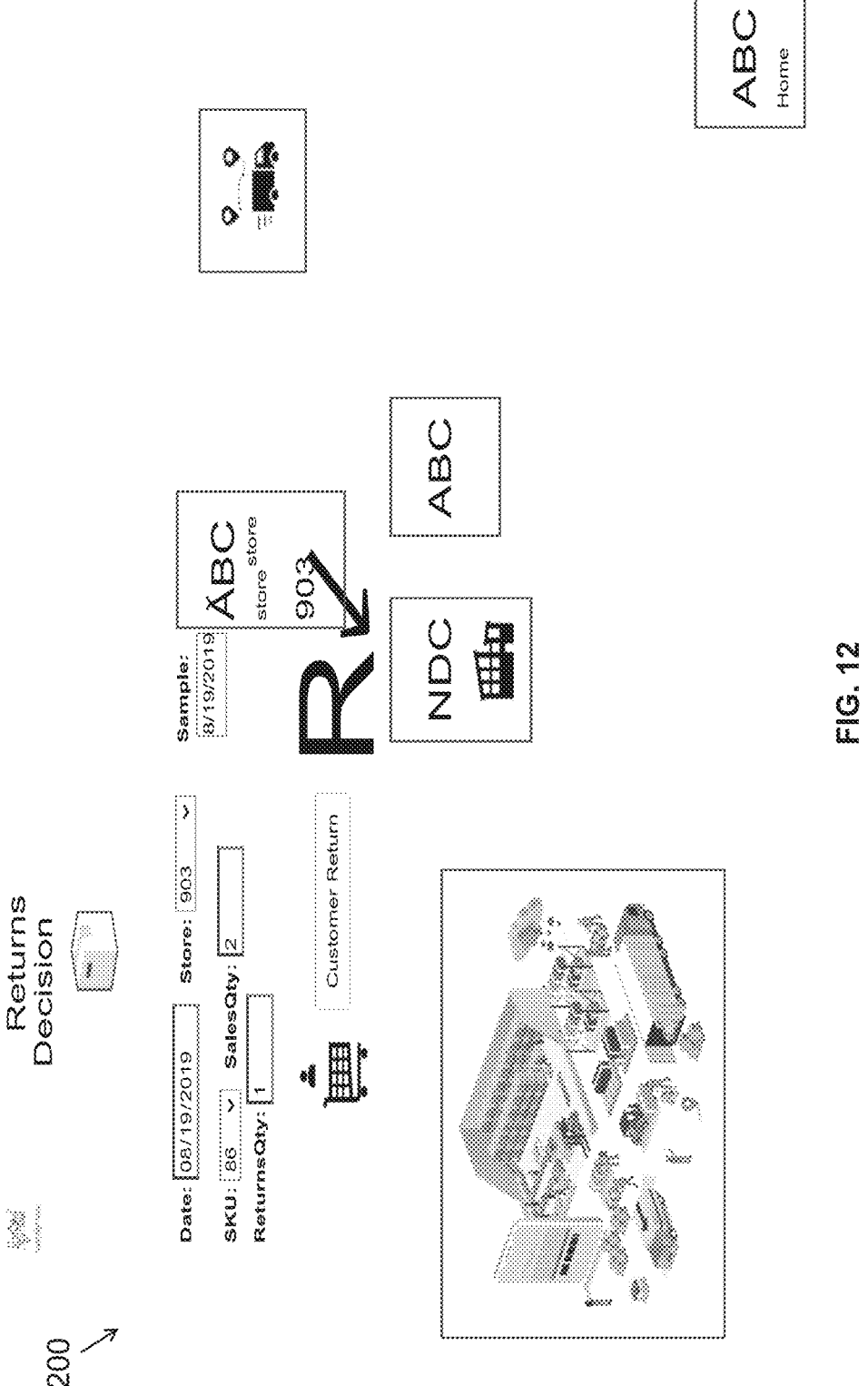
FIG. 12 shows a demo use case for Returns decision, according to some embodiments of the present disclosure.
Figure 13:
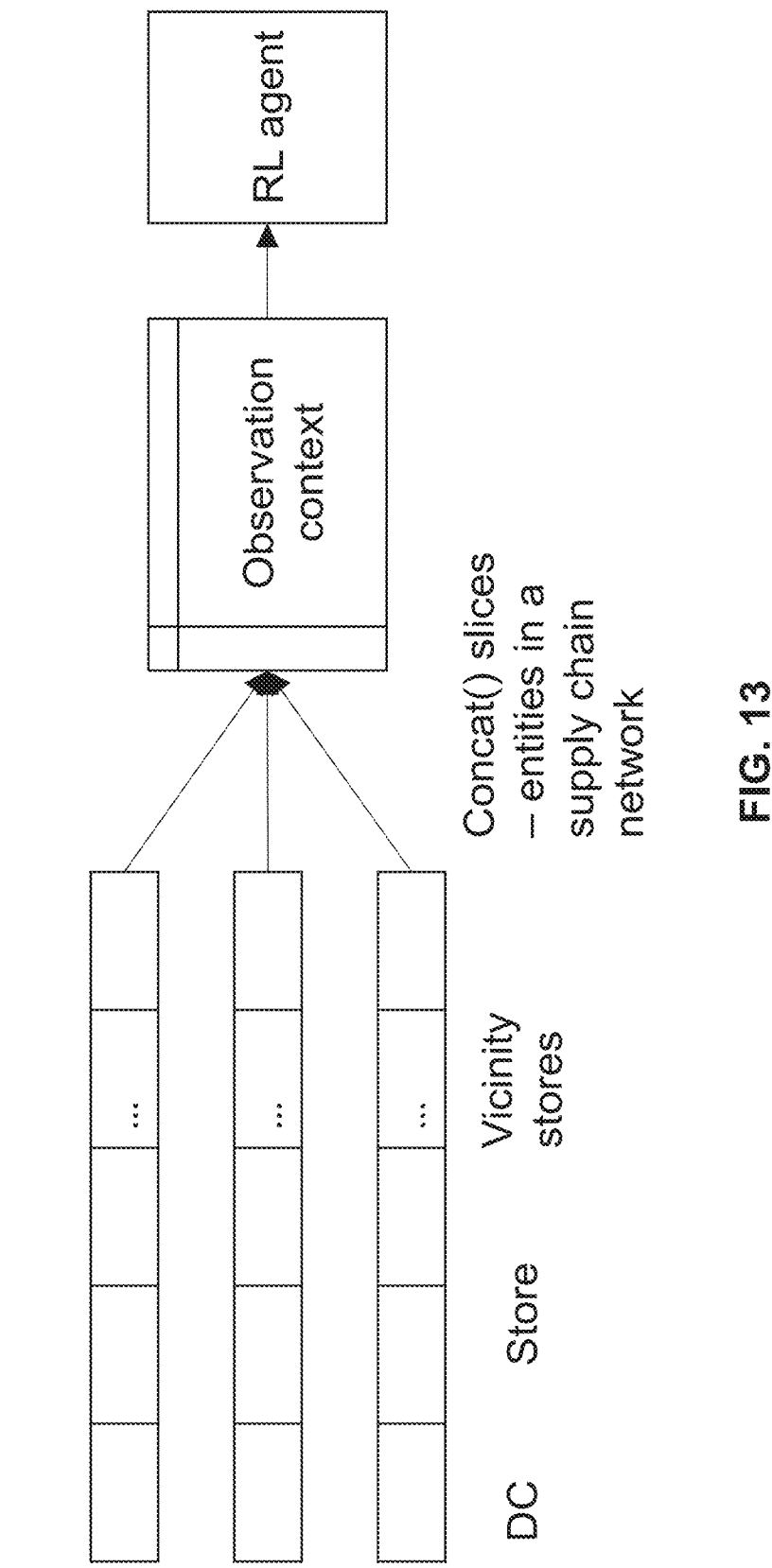
FIG. 13 shows an AI based solution for Returns decision management with an item returned in a store (return site) and candidate sites (vicinity stores), according to some embodiments of the present disclosure.

FIG. 12 shows a demo use case for Returns decision. The trained AI model is used to replay an episode for a returned item on a particular date to evaluate an optimal strategy for its return to the store number, the vicinity store, and the distribution center. The observation space allows us to take a slice of an existing supply chain and evaluate it in an RL agent. This could include state information for entities in a supply chain such as inventory levels or upcoming sales details. This information constitutes an observation value in an environment to train a RL model as shown in FIG. 13.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure herein address unresolved problems in existing initiatives to optimize costs and streamlining the returns process which are based on legacy infrastructure and explicit rules such as a SQL database.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:

receiving, via an input/output interface, an input data, wherein the input data includes one or more returned items, a Stock Keeping-Unit (SKU) of each one or more returned items, store numbers, vicinity stores, a regional delivery center, T–1 sales, and T–1 returns;

pre-processing, via one or more hardware processors, the received input data to remove outliers and sort values of a plurality of inputs based on a predefined format to generate a pre-processed input data and creates a data set to input to a reinforcement learning (RL) model using details such as a data, a store, an item SKU and a corresponding warehouse, a value of sales and returns to obtain outcomes that is a sales dataset being transformed for return's decision application;

forecasting, via one or more hardware processors, an actual sale and an actual return from the pre-processed input data using a predefined forecasting technique;

computing, via the one or more hardware processors, a Stock-Transfer-Return (STR) data using the pre-processed input data, wherein steps for computing STR comprises;

determining sales demand for each of the one or more returned items for the store number and the item SKU from the forecasted actual sale and T–1 sale, wherein based on the outcome of the determined sales demand of the one or more returned items is (1) re-stocked in the store, or (2) transferred to the vicinity store, or (3) returned to the regional distributor center (DC); and determining sales demand for each of the one or more returned items in the vicinity store associated with the store number and the item SKU from the forecasted actual sale and T−1 sale, wherein based on the outcome of the determined sales demand in the vicinity store the item is (1) transferred to the vicinity store, or (2) returned to the regional distributor center (DC);

creating, via the one or more hardware processors, an environment model for the STR data to train a Reinforcement Learning (RL) agent and a model agent reward, wherein the environmental model is created using an OpenAI gym base class and initialized using the input data and set of functions are customized to implement the OpenAI gym base class for a supply chain simulation and reinforcement learning, wherein the environment model aids to model classical actors in the supply chain simulation and a return decision class interacts with the RL agent in episodic timesteps through each of the functions, among the set of functions, being available only as abstract class in a OpenAI gym tool kit, wherein the RL model learns optima in a user dataset through exploration and exploitation of a reward function, thereby reinforcing positive outcomes and penalizing negative outcomes during RL training, and defining rewards strategy allows the RL agent to learn an exploratory search space and propagate intermediate q-value rewards for unknown outcomes to take an informed decision; and training, via one or more hardware processors, the RL agent with the computed STR data using the OpenAI gym tool kit to generate a return decision of the one or more returned items to (1) re-stock in the store, or (2) transfer to a vicinity store, or (3) return to the regional distributor center.

2. The processor-implemented method of claim 1, wherein a control logic for creation and initializing the environment model for training the RL agent.

3. The processor-implemented method of claim 1, wherein the control logic includes a reset step to initialize a current context data frame pointer to an initial value of −1 and update state value to the value in a next context data frame of the environment model.

4. The processor-implemented method of claim 1, wherein a state and reward value are provided to the RL agent in a timestep episodic manner to train.

5. The processor-implemented method of claim 1, wherein an action value is determined by the RL agent in a timestep manner to provide to the environment.

6. The processor-implemented method of claim 1, wherein the control logic updates a new state value to the value in the next context data frame of the environment model.

7. The processor-implemented method of claim 1, wherein a STR reward is calculated to determine a reward value corresponding to the action in the environment model.

8. The processor-implemented method of claim 1, wherein a done value is determined by the environment model when a current pointer is at the last index of the context data frame.

9. A system comprising:

an input/output interface, to receive an input data, wherein the input data includes one or more returned items, a Stock Keeping-Unit (SKU) of each one or more returned items, store numbers, vicinity stores, a regional delivery center, T−1 sales, and T−1 returns;

a memory in communication with the one or more hardware processors, wherein the one or more hardware processors are configured to execute programmed instructions stored in the memory to:

pre-process the received plurality of input data to remove outliers and sort values of the plurality of inputs based on a predefined format to generate a pre-processed input data and creates a data set to input to a reinforcement learning (RL) model using details such as a data, a store, an item SKU and a corresponding warehouse, a value of sales and returns to obtain outcomes that is a sales dataset being transformed for return's decision application;

forecast an actual sale and an actual return from the pre-processed input data using a predefined forecasting technique;

compute a Stock-Transfer-Return (STR) data using the pre-processed input data, wherein steps for computing STR comprises:

determining sales demand for each of the one or more returned items for the store number and the item SKU from the forecasted actual sale and T−1 sale, wherein based on the outcome of the determined sales demand of the each of the one or more returned items is (1) re-stocked in the store, or (2) transferred to the vicinity store, or (3) returned to the regional distributor center (DC); and determining sales demand for each of the one or more returned items in the vicinity store associated with the store number and the item SKU from the forecasted actual sale and T−1 sale, wherein based on the outcome of the determined sales demand in the vicinity store the item is (1) transferred to the vicinity store, or (2) returned to the regional distributor center (DC);

create an environment model for the STR to train a Reinforcement Learning (RL) agent and a model agent reward, wherein the environmental model is created using an OpenAI gym base class and initialized using the input data and set of functions are customized to implement the OpenAI gym base class for a supply chain simulation and reinforcement learning, wherein the environment model aids to model classical actors in the supply chain simulation and a return decision class interacts with the RL agent in episodic timesteps through each of the functions, among the set of functions, being available only as abstract class in a OpenAI gym tool kit, wherein the RL model learns optima in a user dataset through exploration and exploitation of a reward function, thereby reinforcing positive outcomes and penalizing negative outcomes during RL training, and defining rewards strategy allows the RL agent to learn an exploratory search space and propagate intermediate q-value rewards for unknown outcomes to take an informed decision; and train the RL agent with the computed STR data using the OpenAI gym tool kit to generate a return decision of the one or more returned items to (1) re-stock in the store, or (2) transfer to a vicinity store, or (3) return to the regional distributor center.

10. The system of claim 9, wherein the control logic includes a reset step to initialize a current context data frame pointer to an initial value of −1 and updating state value to the value in a next context data frame of the environment model.

11. The system of claim 9, wherein the control logic initializes the environment model for training the RL agent and updating a new state value to the value in the next context data frame of the environment model.

12. The system of claim 9, wherein a state and reward value are provided to the RL agent in a timestep episodic manner to train, and wherein an action value is determined by the RL agent in a timestep manner to provide to the environment.

13. The system of claim 9, wherein a Stock-Transfer-Return (STR) reward is calculated to determine a reward value corresponding to the action in the environment model.

14. The system of claim 9, wherein a done value is determined by the environment model when a current pointer is at the last index of the context data frame.

15. One or more non-transitory machine-readable information storage mediums comprising one or more instructions which when executed by one or more hardware processors cause:

receiving, via an input/output interface, an input data, wherein the input data includes one or more returned items, a Stock Keeping-Unit (SKU) of each one or more returned items, store numbers, vicinity stores, a regional delivery center, T–1 sales, and T–1 returns;

pre-processing the received input data to remove outliers and sort values of a plurality of inputs based on a predefined format to generate a pre-processed input data and creates a data set to input to a reinforcement learning (RL) model using details such as a data, a store, an item SKU and a corresponding warehouse, a value of sales and returns to obtain outcomes that is a sales dataset being transformed for return's decision application;

forecasting an actual sale and an actual return from the pre-processed input data using a predefined forecasting technique;

computing, via the one or more hardware processors, a Stock-Transfer-Return (STR) data using the pre-processed input data, wherein steps for computing STR comprises;

determining sales demand for each of the one or more returned items for the store number and the item SKU from the forecasted actual sale and T –1 sale, wherein based on the outcome of the determined sales demand of the one or more returned items is (1) re-stocked in the store, or (2) transferred to the vicinity store, or (3) returned to the regional distributor center (DC); and determining sales demand for each of the one or more returned items in the vicinity store associated with the store number and the item SKU from the forecasted actual sale and T–1 sale, wherein based on the outcome of the determined sales demand in the vicinity store the item is (1) transferred to the vicinity store, or (2) returned to the regional distributor center (DC);

creating an environment model for the STR data to train a Reinforcement Learning (RL) agent and a model agent reward, wherein the environmental model is created using an OpenAI gym base class and initialized using the input data and set of functions are customized to implement the OpenAI gym base class for a supply chain simulation and reinforcement learning, wherein the environment model aids to model classical actors in the supply chain simulation and a return decision class interacts with the RL agent in episodic timesteps through each of the functions, among the set of functions, being available only as abstract class in a OpenAI gym tool kit, wherein the RL model learns optima in a user dataset through exploration and exploitation of a reward function, thereby reinforcing positive outcomes and penalizing negative outcomes during RL training, and defining rewards strategy allows the RL agent to learn an exploratory search space and propagate intermediate q-value rewards for unknown outcomes to take an informed decision; and training the RL agent with the computed STR data using the OpenAI gym tool kit to generate a return decision of the one or more returned items to (1) re-stock in the store, or (2) transfer to a vicinity store, or (3) return to the regional distributor center.

16. The one or more non-transitory machine-readable information storage mediums of claim 15, wherein a control logic for creation and initializing the environment model for training the RL agent, and wherein the control logic updates a new state value to the value in the next context data frame of the environment model.

17. The one or more non-transitory machine-readable information storage mediums of claim 15, wherein the control logic includes a reset step to initialize a current context data frame pointer to an initial value of –1 and updating state value to the value in a next context data frame of the environment model.

18. The one or more non-transitory machine-readable information storage mediums of claim 15, wherein a state and reward value are provided to the RL agent in a timestep episodic manner to train.

19. The one or more non-transitory machine-readable information storage mediums of claim 15, wherein an action value is determined by the RL agent in a timestep manner to provide to the environment.

20. The processor-implemented method of claim 1, wherein a STR reward is calculated to determine a reward value corresponding to the action in the environment model.

\* \* \* \* \*